(12) United States Patent
Okabe et al.

(10) Patent No.: US 6,953,282 B2
(45) Date of Patent: Oct. 11, 2005

(54) LINEAR GUIDE PLAIN BEARING

(75) Inventors: Noboru Okabe, Narashino (JP); Hiroyoshi Kikuchi, Narashino (JP)

(73) Assignee: NDC Company Ltd., Chiba (JP)

( * ) Notice: Subject to any disclaimer, the term of this patent is extended or adjusted under 35 U.S.C. 154(b) by 361 days.

(21) Appl. No.: 10/287,003

(22) Filed: Nov. 4, 2002

(65) Prior Publication Data

US 2003/0099414 A1 May 29, 2003

(30) Foreign Application Priority Data

Nov. 27, 2001 (JP) .................................. 2001-360609

(51) Int. Cl.[7] .............................................. F16C 29/02
(52) U.S. Cl. ...................................... 384/42; 384/13
(58) Field of Search ........................ 384/42, 908, 13, 384/913, 26

(56) References Cited

FOREIGN PATENT DOCUMENTS

| JP | 09-296824 | 11/1997 |
|----|-----------|---------|
| JP | 2001-003934 | 1/2001 |

*Primary Examiner*—Lenard A. Footland
(74) *Attorney, Agent, or Firm*—Browdy and Neimark, PLLC

(57) ABSTRACT

A novel linear guide plain bearing has a guide rail with rail-grooves formed respectively in opposite side surfaces thereof, and a slider with slider-ridges formed respectively on opposed inner side surfaces thereof. The slider is mounted in a straddling manner on the guide rail for sliding movement therealong. Each of the guide-grooves has a Gothic arch cross-sectional shape while each of the slider-ridges has a circular arch cross-sectional shape. The slider slides relative to the guide rail in an axial line contact condition. A solid lubricant-containing resin coating is formed on each of the slider-ridges, whereby the sliding resistance and sliding noise can be reduced more efficiently.

8 Claims, 4 Drawing Sheets

LINEAR GUIDE PLAIN BEARING

BACKGROUND OF THE INVENTION

1. Field of the Invention

This invention relates to a linear guide plain bearing used in machine tools, industrial machines, conveyance apparatuses, robots, various measuring instruments and so on.

2. Prior Art

Such a bearing is classified into a linear guide plain bearing and a linear guide roller bearing. One conventional linear guide plain bearing is disclosed in JP-A-9-296824. This bearing comprises a guide rail, having longitudinal grooves formed on an outer surface thereof, and a slider, which has grooves (corresponding respectively to the grooves in the guide rail) formed on an inner surface thereof, and is mounted on the guide rail for sliding movement therealong. Each of sliding members, made of lubricant-containing rubber or synthetic resin, is interposed between the corresponding opposed grooves of the guide rail and the slider. In this linear guide plain bearing, a lubricant (such as grease, paraffin hydrocarbon oil, mineral oil, ether oil and ester oil), impregnated in each of the sliding members, gradually oozes out, and is automatically supplied to the groove of the guide rail.

Another conventional linear guide plain bearing is disclosed in JP-A-2001-3934. This bearing comprises a slider, which has tapering sliding surfaces formed on an inner side thereof, and is made of a tin-containing-aluminum alloy sliding material (which exhibits a good sliding performance in a non-lubricating condition), and a guide rail. Tapering sliding surfaces, corresponding respectively to the sliding surfaces of the slider, are formed respectively on opposite side surfaces of the guide rail, and a solid lubricant-containing resin coating, which exhibits a good sliding performance in a non-lubricating condition, is formed on each of the sliding surfaces of the guide rail so that the sliding surfaces of the slider can slidingly move respectively on these resin coatings. In this linear guide plain bearing, the number of the component parts is smaller as compared with conventional products, and the working is easier, and therefore the linear guide mechanism of the non-lubricating structure, achieving the compact, lightweight and inexpensive design, can be maintained for a long period of time.

Here, a study will be made with respect to the linear guide plain bearing disclosed in JP-A-9-296824. In this linear guide plain bearing, the sliding members, each provided between the corresponding opposed grooves, are essential, and there are needed thick end caps fixedly securing the sliding members to the front and rear ends of the slider. Therefore, this plain bearing has drawbacks that the structure is complicated and that the number of the component parts is increased. Further, the grooves for the mounting of the sliding members are provided at the guide rail and the slider, and more specifically the grooves are formed respectively at the opposite side portions of the guide rail, while the grooves are formed respectively at the opposite side portions of the slider opposed respectively to the grooves of the guide rail. The guide rail and the slider need to have their respective predetermined thicknesses since the grooves, sufficiently large to receive the respective sliding members, must be provided at the guide rail and the slider. As a result, this bearing has drawbacks that the working and the mounting of the members become complicated, and that the bearing itself is increased in size, weight and cost.

Next, a study will be made with respect to the linear guide plain bearing disclosed in JP-A-2001-3934. In this linear guide plain bearing, the tapering sliding surfaces of the slider slide or move respectively on the tapering solid lubricant-containing resin coatings of the guide rail, and therefore it is thought that the reduction of a sliding resistance, achieved by the surface-to-surface sliding contact between the corresponding sliding surfaces, is limited.

BRIEF SUMMARY OF THE INVENTION

The present invention has been made in view of the drawbacks of the above conventional linear guide plain bearings and drawbacks of linear guide bearings which function generally in the same manner as the bearings of this type, and in which a slider moves while circulating balls (serving as rolling elements) provided therein, and an object of the invention is to provide a novel linear guide plain bearing which can be used in any environments as in extremely cold, high-temperature, underwater and vacuum conditions, and can reduce a sliding resistance and sliding noises to a lower level as compared with the conventional linear guide plain bearings of the non-lubricating type. The bearing of the invention does not need to be provided with any such holding means as used in the linear guide bearing, in which the slider moves while circulating the balls, so as to prevent the circulating balls from dropping when the slider is separated from a guide rail (which is a drawback of the linear guide bearing movable while circulating the balls).

Under the object, according to the present invention, there is provided a linear guide plain bearing consisting of a guide rail which has longitudinal rail-grooves or rail-ridges on both opposed sides thereof; and a slider which is longitudinally slidably mounted on the guide rail so as to hold the guide rail and which has longitudinal slider-ridges or slider-grooves complementarily engaging with the rail-grooves or rail-ridges of the guide rail, wherein the respective groove of the rail-grooves or slider-grooves has a Gothic arch cross-sectional form, and the respective ridge of the slider-ridges or rail-ridges has a circular arch cross-sectional form, whereby the ridge and the groove are slidably in linear contact with each other.

The guide rail and the slider may be made of stainless steel. And with regard to the combination of the rail-grooves and the slider-ridges, or the combination of the rail-ridges and the slider-grooves, at least one of the respective combination may be provided with a resin coating which contains a solid lubricant.

Preferably, the guide rail and the slider are made of stainless steel which may be chrome stainless steel, chrome-nickel stainless steel, martensitic stainless steel, austenitic stainless steel, precipitation hardened stainless steel or two-phase stainless steel. Known materials, such as PTFE (polytetrafluoroethylene), tungsten disulfide, molybdenum disulfide and graphite, can be used as the solid lubricant contained in the solid lubricant-containing resin coating. For forming this resin coating, a thermosetting resin (such as epoxy, polyamide or polyimide resin) solution, containing the above solid lubricant and additives, is spray coated onto the relevant surface, and is cured at 150 to 350° C. for 10 to 60 minutes.

According to one embodiment of the invention linear guide plain bearing, the rail-grooves, formed respectively on the opposite side surfaces of the guide rail, have a Gothic arch cross-sectional shape, while the slider-ridges, formed respectively on the opposed inner side surfaces of the slider, have a circular arch cross-sectional shape. In the embodiment, the rail-groove of the guide rail and the slider-ridge of the slider are in contact with each other at two points in the cross-section, and thus the slider slides relative to the guide rail in such a manner that each slider-ridge is in linear contact with the corresponding rail-groove of the guide rail at two parallel spaced linear lines extending in the axial direction. Namely, the slider is arranged so as to be held by the two points in the right and left regions of each of the respective rail-grooves, in the cross-section, provided respectively on the opposite side surfaces of the guide rail, such that a raceway track for the slider is fixed. It will be readily appreciated that a similar effect to the above embodiment can be obtained also by another type of the linear guide plain bearing in which the rail-ridges, formed respectively on the opposite side surfaces of the guide rail, have a circular arch cross-sectional shape, while the slider-grooves, formed respectively on the opposed inner side surfaces of the slider, have a Gothic arch cross-sectional shape.

According to still another embodiment of the invention linear guide plain bearing, each of the slider-ridges, formed respectively on the opposed inner side surfaces of the slider, is provided with the solid lubricant-containing resin coating, and the resin coatings serve to more efficiently reduce the sliding resistance and the operation noise produced during the sliding movement of the slider along the guide rail. Furthermore, an abrasion metal powder produced during a sliding movement, foreign substances or the like can be embedded in the lubricant-containing resin coating formed on the slider-ridges, thereby obtaining advantages that seizure or adhesion between the slider and the guide rail during the sliding movement is prevented. It will be readily appreciated that a similar effect to the above embodiment can be obtained also by another type of the bearing wherein the rail-grooves which engage respectively with the slider-ridges of the slider, and which are formed respectively in the opposite side surfaces of the guide rail, are provided with the solid lubricant-containing resin coating, respectively. Such effect can be obtained also in the cases of still another type of bearing wherein the slider-ridges, which are formed respectively on the opposed inner side surfaces of the slider, and the rail-grooves of the guide rail, are provided with a solid lubricant-containing resin coating, respectively, and of still further type of bearing wherein the rail-ridges, which are formed respectively on the opposite side surfaces of the guide rail, have a circular arch cross-sectional shape, while the slider-grooves, which are formed respectively in the opposed inner side surfaces of the slider, have a Gothic arch cross-sectional shape, if one or both of the opposed ridges and grooves are provided with the solid lubricant-containing resin coating.

BRIEF DESCRIPTION OF EMBODIMENTS OF THE INVENTION

A preferred embodiment of the present invention will now be described in detail.

Figure 1:
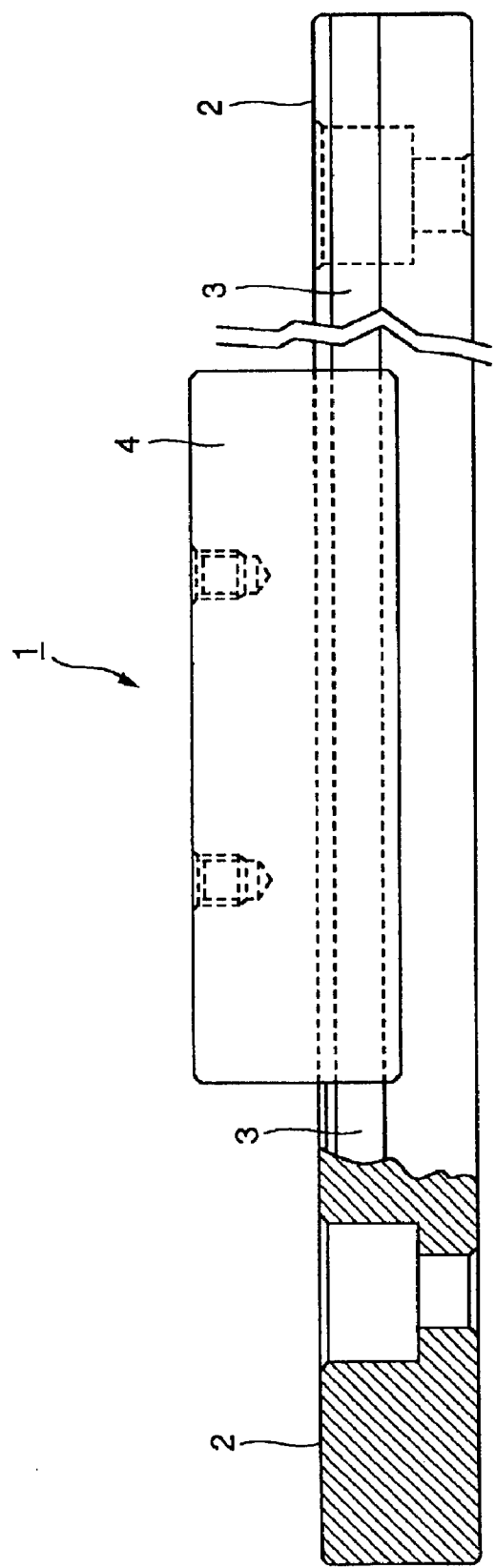
FIG. 1 is a partially-broken front-elevational view of one embodiment of a linear guide plain bearing of the present invention.

FIG. 1 is a partially-broken front-elevational view of one preferred embodiment of a linear guide plain bearing of the present invention. As shown in the drawings, the linear guide plain bearing 1 comprises a guide rail 2, having a pair of longitudinal rail-grooves 3 formed respectively in opposite side surfaces thereof, and a slider 4 mounted, in a straddling manner, on the guide rail 2 for sliding movement therealong. The guide rail 2 and the slider 4 are made of martensitic stainless steel, respectively, thereby being capable of keeping a good sliding movement therebetween in a wide variety of environments of use, without occurrence of rust.

Figure 2:
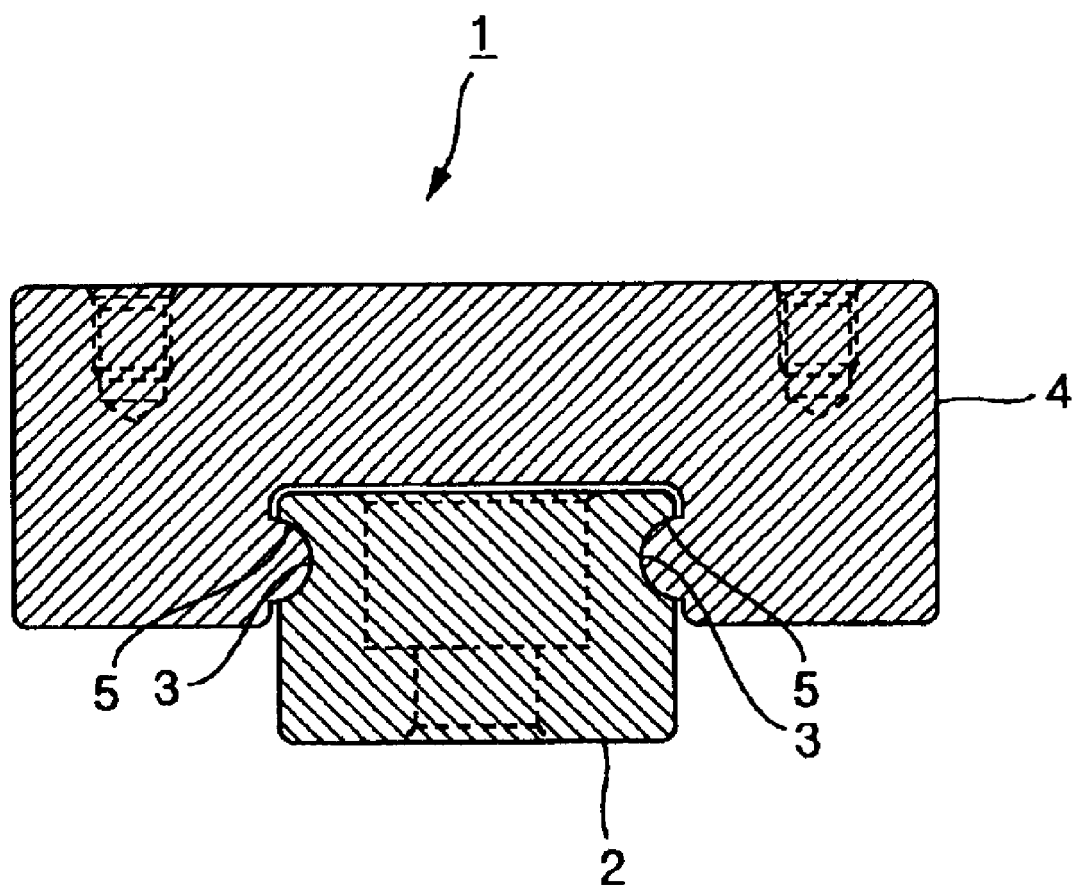
FIG. 2 is a cross-sectional view of the linear guide plain bearing shown in FIG. 1.

FIG. 2 is a cross-sectional view of the linear guide plain bearing of the invention shown in FIG. 1. As shown in the drawings, the pair of rail-grooves 3, each having a Gothic arch cross-sectional shape, are formed respectively in the opposite side surfaces of the guide rail 2, and are spaced from the top surface of the guide rail 2. On the other hand, a pair of slider-ridges 5, each having a circular arch cross-sectional shape, are formed respectively on opposed inner side surfaces of the slider 4, and face to the grooves 3 of the guide rail 2, respectively. The slider 4 is axially slidably mounted, in a straddling manner, on the guide rail 2, with the ridges 5 engaged respectively with the grooves 3.

Figure 3:
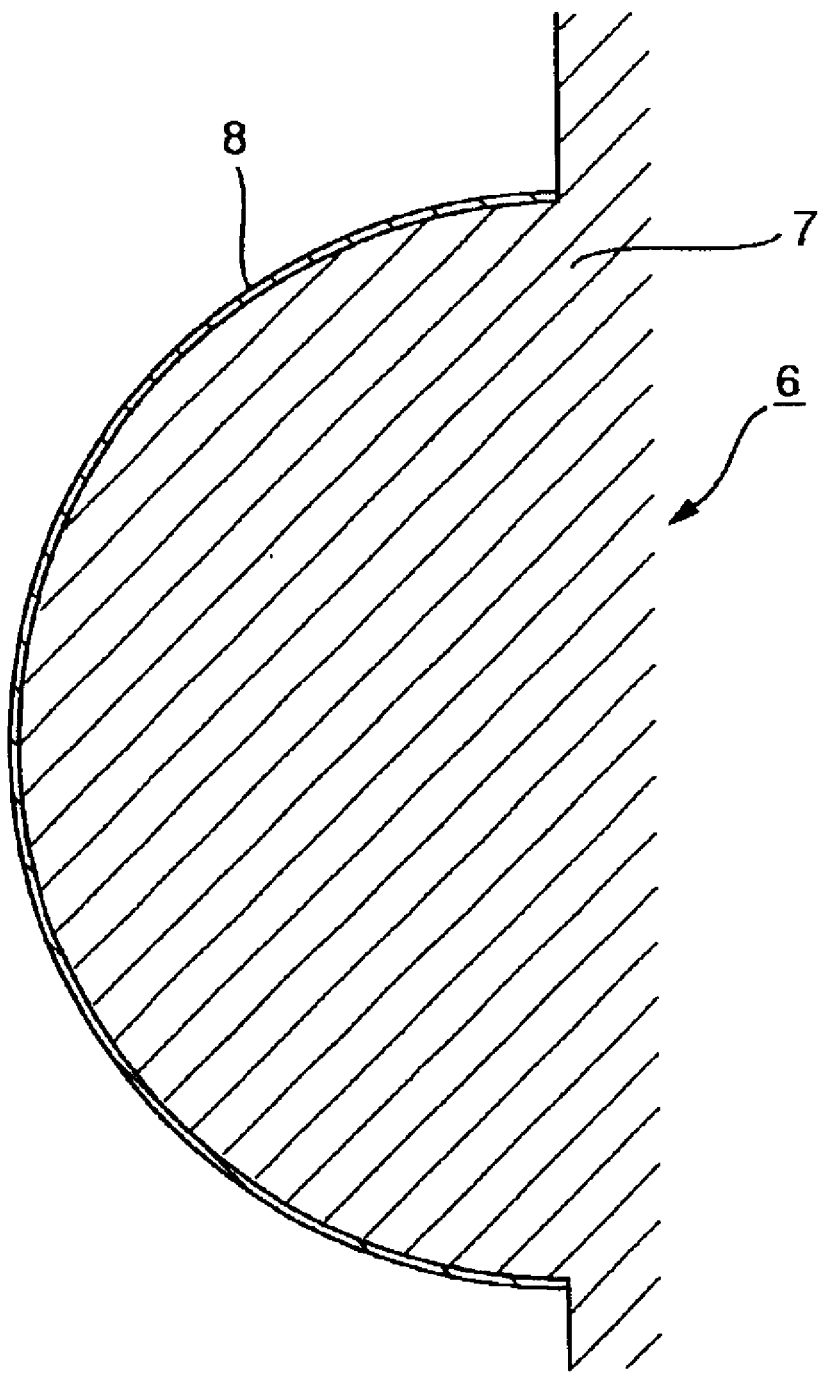
FIG. 3 is an enlarged partial cross-sectional view of a slider of a linear guide plain bearing according to another embodiment of the invention.

FIG. 3 is an enlarged, partial cross-sectional view of a slider in another embodiment of a linear guide plain bearing according to the invention. In this embodiment, a pair of slider-ridges 7, each having a circular arch cross-sectional shape, are formed respectively on opposed inner side surfaces of the slider 6 as described above for the linear guide plain bearing 1 of the preceding embodiment. This embodiment differs from the preceding embodiment in the point that a solid lubricant-containing resin coating 8, which contains a solid lubricant, is formed on the surface of each of the two slider-ridges 7. Molybdenum disulfide as a known solid lubricant is added to a thermosetting epoxy resin, and this is applied onto the slider-ridges 7 by the spray coating method. Subsequently, the coating is cured at 250° C. for 40 minutes.

Figure 4:
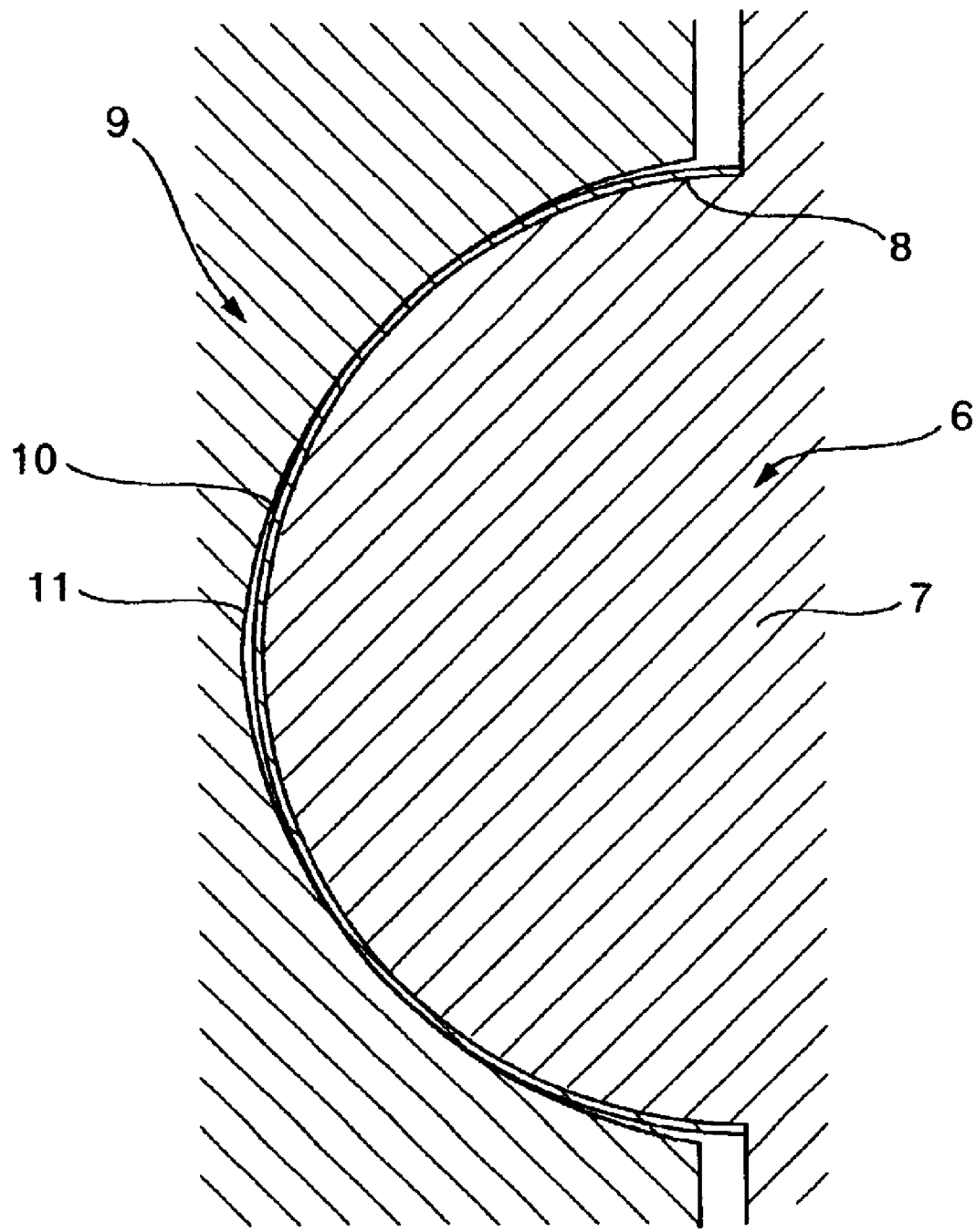
FIG. 4 is an enlarged partial cross-sectional view showing a sliding portion of the guide rail and the slider of the linear guide plain bearing shown in FIG. 3.

FIG. 4 is an enlarged partial cross-sectional view showing a sliding portion of the guide rail and the slider in the linear guide plain bearing of the embodiment shown in FIG. 3. As shown in the drawing, a rail-groove 10 having a Gothic arch cross-sectional shape 11 is formed on the guide rail 9. The slider-ridge 7, having a circular arch cross-sectional shape and provided with the solid lubricant-containing resin coating 8, is in sliding contact with the rail-groove 10 of the guide rail 9. As shown in FIG. 4, the rail-groove 10 of the guide rail 9 and the slider-ridge 7 of the slider 6 are in contact with each other at two regions which are positioned obliquely upwardly at an angle of 45° and obliquely downwardly at an angle of 45° from the middle point of a circular arc contour of the slider-ridge 7 with respect to the center of the circular arc. Thus, since the rail-groove 10 of the guide rail 9 and the slider-ridge 7 of the slider 6 are in sliding contact with each other at the two points in the cross-section, the slider 6 slides relative to the guide rail 9 in such a manner that the slider-ridges 7 are in linear contact with the rail-grooves 10 formed on the opposed both side surfaces of the guide rail 9, respectively, at two parallel spaced axial lines, so that the sliding resistance is much smaller as compared with the conventional surface-to-surface sliding contact. Further, since the slider 6 is in contact with each of the two rail-grooves 10, formed on the opposite side surfaces of the guide rail 9, so as to be held at the two points on each of the right and left sides in the cross-section, a raceway track for the slider 6 is fixed accurately. In this respect, in the case where each of the longitudinal grooves 10 has a circular arch cross-sectional shape, since the slider 6 is in sliding contact with the guide rail 9 at one point, in the cross-section, on each of the right and left sides, the raceway track of the slider 6 is liable to vary, and therefore this construction can not be adopted.

The linear guide plain bearings of the present invention is constructed as described above, and has the following advantageous effects.

The linear guide plain bearing of the invention is the type of plain bearing capable of satisfactorily guiding the linear movement of the slider in a non-lubricating condition, and is not complicated in structure since it does not need to be provided with a ball holding member as used in a linear guide bearing (in which a slider moves while circulating balls (serving as rolling elements) provided therein), and the plain bearing of the invention basically comprises only the guide rail and the slider, thus achieving an advantage that the number of the component parts can be reduced. Thus, in the linear guide plain bearing of the invention, the number of the component parts is small, and the working and the assembling are easy, and therefore there are achieved advantages that the compact and lightweight design of the bearing can be achieved and that the bearing can be produced at low cost.

And besides, the linear guide plain bearing of the invention can be used in a non-lubricating condition, and the guide rail and the slider are made of stainless steel, and therefore there is achieved an advantage that the bearing can perform the satisfactory functions in a wide variety of environments as in extremely cold, high-temperature, underwater and vacuum conditions.

Furthermore, in the linear guide plain bearing of the invention, the rail-grooves or the slider-grooves have the Gothic arch cross-sectional shape, and each groove is in contact with the corresponding slider-ridge or rail-ridge at the two points in the cross-section. Therefore, the sliding resistance and the sliding noises can be reduced, and the slider is in contact with each of the two grooves or ridges formed respectively in the opposite side surfaces of the guide rail on each of the right and left sides so as to be held by the two points in the cross-section. Thus, the raceway track for slider can be accurately fixed.

Further, in the linear guide plain bearing of the invention, the solid lubricant-containing resin coating is formed on each groove or ridge, and therefore there is achieved an advantage that the sliding resistance, produced during the sliding movement of the slider along the guide rail, and the operating noises, produced during this sliding movement, can be reduced more efficiently. An abrasion metal powder, produced during the sliding movement, foreign substances or the like, can be embedded in the lubricant-containing resin coating, formed on the groove or ridge, thereby achieving an advantage that the seizure or adhesion between the slider and the guide rail during sliding is prevented.

What is claimed is:

1. A linear guide plain bearing comprising a guide rail which has longitudinal rail-grooves or rail-ridges on both opposed sides thereof; and a slider which is longitudinally slidably mounted on the guide rail so as to hold the guide rail and which has longitudinal slider-ridges or slider grooves complementarily engaging with the rail-grooves or rail-ridges of the guide rail,
   wherein the respective groove of the rail-grooves or slider-grooves has a Gothic arch cross-sectional form, and the respective ridge of the slider-ridges or rail-ridges has a circular arch cross-sectional form, whereby the ridge and the groove are slidably in linear contact with each other.

2. A linear guide plain bearing according to claim 1, wherein the guide rail and the slider are made of stainless steel.

3. A linear guide plain bearing according to claim 1, wherein at least one of the combination of the rail-grooves and the slider-ridges are provided with a resin coating which contains a solid lubricant, when the guide rail has the rail-grooves and the slider has the slider-ridges.

4. A linear guide plain bearing according to claim 2, wherein at least one of the combination of the rail-grooves and the slider-ridges are provided with a resin coating which contains a solid lubricant, when the guide rail has the rail-grooves and the slider has the slider-ridges.

5. A linear guide plain bearing according to claim 1, wherein at least one of the combination of the rail-ridges and the slider-grooves are provided with a resin coating which contains a solid lubricant, when the guide rail has the rail-ridges and the slider has the rail-grooves.

6. A linear guide plain bearing according to claim 1, wherein at least one of the combination of the rail-ridges and the slider-grooves are provided with a resin coating and the slider-grooves are provided with a resin coating which contains a solid lubricant, when the guide rail has the rail-ridges and the slider has the rail-grooves.

7. The linear guide plain bearing according to claim 1, wherein the guide rail and the slider are uncoated.

8. A linear guide plain bearing consisting of a guide rail having an elongated bar form, and a slider which is longitudinally slidably mounted on the guide rail so as to hold the guide rail, wherein the slider and the guide rail engage with each other on opposite side faces of the guide rail so that the engagement is of a complementary fitting relationship between a longitudinal ridge and a longitudinal groove which are formed alternatively on opposed engagement surfaces of the guide rail and the slider, and wherein the engaged longitudinal groove has a Gothic arch cross-section form and the engaged ridge has a circular arch cross-sectional form.

* * * * *